Patented Feb. 28, 1939

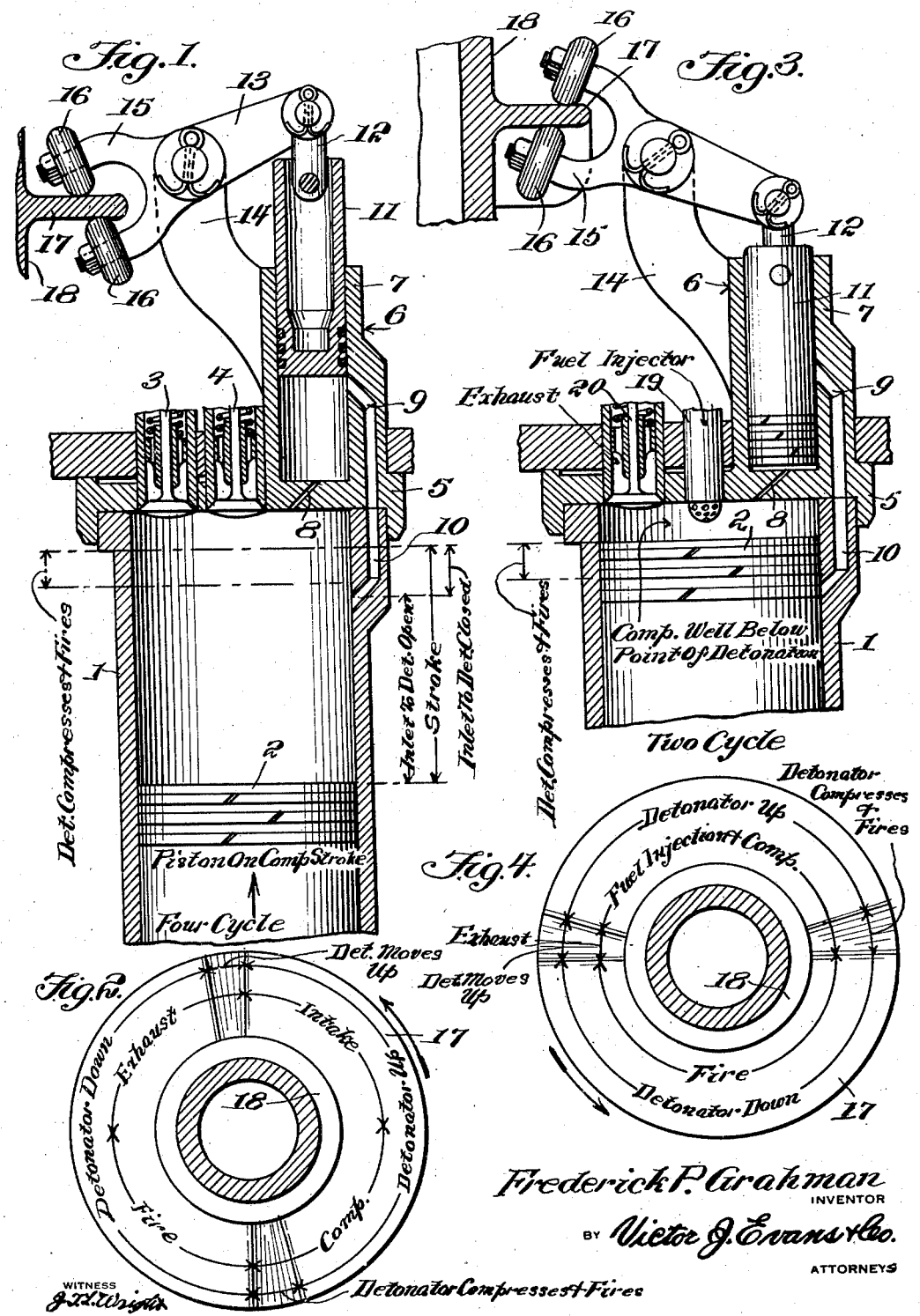

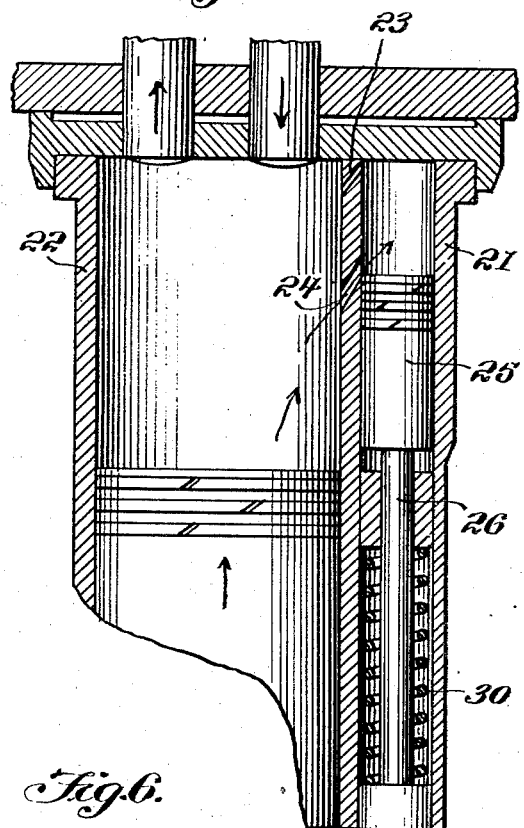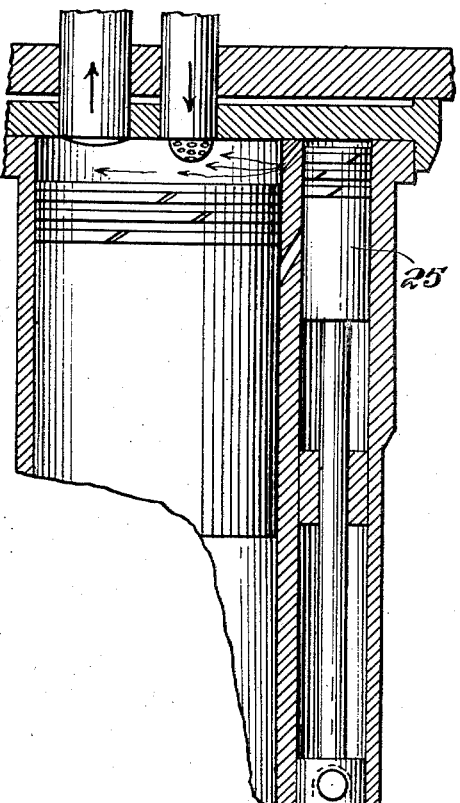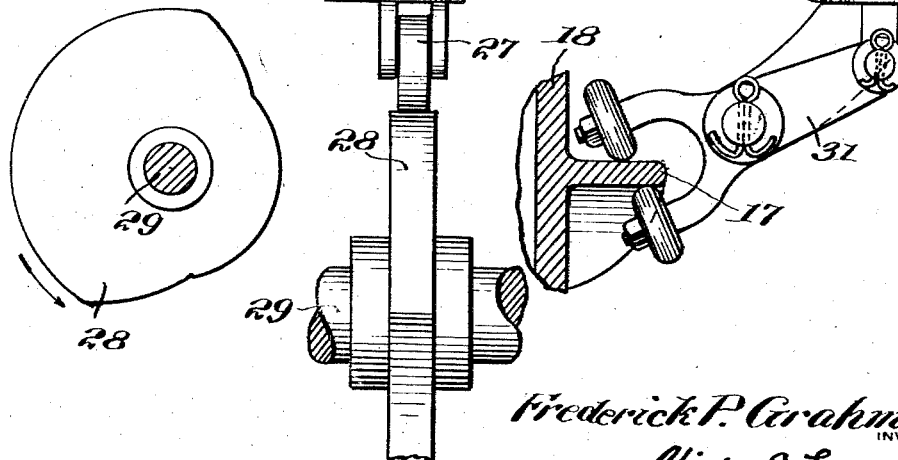

2,148,458

UNITED STATES PATENT OFFICE 2,148,458

DETONATOR FOR INTERNAL COMBUSTION ENGINES

Frederick P. Grahman, De Land, Fla.

Application June 29, 1937, Serial No. 151,014

1 Claim. (Cl. 123—143)

This invention relates to detonators for internal combustion engines of any type and operating on either the two or four cycle principle and has for the primary object the provision of a device of this character which will increase the efficiency of an engine and especially one operating on any commercial low grade fuel and permits a low compression ratio to be employed in the power cylinder and a relatively high compression ratio to be used in the detonator for reducing to a minimum the amount of power heretofore used in compressing fuel in a power cylinder and assures positive and thorough ignition of the fuel in said power cylinder and consists of a minimum number of parts.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary vertical sectional view illustrating a power cylinder and piston of an internal combustion engine with a detonator adapted thereto and constructed in accordance with my invention.

Figure 2 is a diagrammatical view showing the cycle of operation of the engine and detonator disclosed in Figure 1.

Figure 3 is a view similar to Figure 1 showing my invention adapted to a power cylinder and piston of an engine operating on a two cycle engine.

Figure 4 is a diagrammatical view showing the cycle of operation of the two cycle type of engine shown in Figure 3.

Figure 5 is a fragmentary vertical sectional view illustrating a modified form of my invention.

Figure 6 is a side elevation partly in section showing the cam for operating the type or form of detonator shown in Figure 5.

Figure 7 is a fragmentary vertical sectional view, illustrating the modified form of detonator operated by another type of cam.

Referring in detail to the drawings, the numeral 1 indicates a power cylinder of an internal combustion engine operating on a four cycle principle and 2 the power piston of the power cylinder. The intake and exhaust valves for the power cylinder are indicated by the characters 3 and 4, respectively. The head of the cylinder is indicated by the character 5 in which the intake and exhaust valves are mounted. The head 5 carries a detonator 6 forming the subject matter of the present invention and consists of a detonator cylinder 7 connected with the power cylinder by a small restricted passage 8. A fuel intake passage 9 is formed in the wall of the detonator cylinder 7 and connects with a fuel passage 10 formed in the wall of the cylinder 1. The fuel passage 10 communicates with the interior of the cylinder 1 below the uppermost position that the piston 2 will assume in the cylinder 1. The fuel passage 9 communicates with the interior of the detonator cylinder 7 at a selected distance from the restricted passage 8. A detonator piston 11 is reciprocally mounted in the detonator cylinder 7 and a connecting rod 12 connects said piston 11 to a rocker arm 13. The rocker arm is pivoted on a bracket 14 and includes a bifurcated portion 15 on which are journaled cam engaging rollers 16. The rollers 16 engage a cam rib 17 of a cam element 18. The cam element 18 is driven by the engine in any well known manner and the cam rib is of a shape to rapidly drive the piston 11 to compress fuel therein when the piston 2 of the power cylinder reaches its top dead center position on its compression stroke so as to bring about combustion of the fuel in the detonator cylinder. Burning fuel is forced through the restricted passage 8 into the cylinder 2 to thoroughly ignite the fuel compressed therein. The cam rib 17 slides the piston 11 in an opposite direction when the piston 2 starts on its compression stroke so that fuel being compressed in the power cylinder will be driven into the detonator cylinder 7 by way of the passages 10 and 9. Just prior to the piston 2 reaching its top dead center position on its compression stroke the passage 10 is closed and the passage 9 is closed when the detonator piston moves rapidly to compress the fuel therein, the passage 8 being so small that the fuel can be compressed to a high ratio to bring about spontaneous combustion thereof. This arrangement as heretofore described permits a comparatively low compression ratio to be employed in the power cylinder, consequently reducing the amount of horsepower necessary to compress the fuel in said cylinder 2 and as a comparatively small amount of fuel is taken in the detonator cylinder due to its small dimension only a very small amount of horsepower is utilized in compressing this small amount of fuel to a high ratio to bring about spontaneous combustion thereof. Consequently, it will be seen that an engine equipped with a detonator of this type will be capable of producing more horsepower for the operation of other devices than heretofore possible with internal combustion engines owing to the horsepower conserved in the compressing of fuel in the power cylinder.

Referring to Figure 3, this invention is shown adaptable to a power cylinder of an internal combustion engine operating on a two cycle principle and of the Diesel type wherein a fuel injector 19 is employed and an exhaust valve 20 is used to permit scavenging of the power cylinder. The connection of the detonator to the two cycle engine is the same as that described with the four cycle type. The cam rib which operates the detonator piston when used on an engine of the two cycle principle, of course, will be of a different shape than the type of cam rib employed in Figure 1. In either case the detonator piston is operated rapidly on its sliding movements by the cam rib.

Referring to my modified form of detonator, as shown in Figure 5, the detonator cylinder is indicated by the character 21 and is shown as cast as an integral part of the power cylinder 22 and has communication at its upper end with the power cylinder by an extremely small passage 23. A fuel passage 24 connects the detonator cylinder 21 with the interior of the power cylinder 22 at a selected distance below the passage 23. The detonator piston is indicated by the character 25 and the stem 26 thereof carries a cam roller 27 which engages with a cam 28. The cam 28 is connected in the usual manner to a cam shaft 29 of the engine. The cam roller 27 is caused to ride the cam 28 at all times by a spring 30. The showing made in Figure 5 can be either an engine operating on a two cycle or four cycle principle. During the compression stroke of the piston of the power cylinder 22 fuel is driven into the detonator cylinder 21 by the passage 24 and as the piston of the power cylinder reaches its top dead center position on its power stroke the passage 24 will have been closed and the cam 28 rapidly drives the detonator piston 25 upwardly compressing the fuel in the detonator cylinder to a high compression ratio, bringing about spontaneous combustion. This burning fuel is passed through the small passage 27 and ignites the low compressed fuel within the power cylinder 22.

Referring to Figure 7, the detonator piston 25 is connected to a rocker arm 31 similar in construction to the rocker arm 13. The rocker arm operates in conjunction with the cam 18.

The operating principle of the detonator heretofore described and shown is as follows: When the power piston of the power cylinder is advanced to its peak of its compression stroke or almost to top dead center position of the compression stroke the detonator piston is driven rapidly on its compression stroke compressing the fuel therein bringing about spontaneous combustion, driving said burning fuel through the comparatively small passage 8 and thereby igniting the fuel in the power cylinder. The passage 8 is of such a dimension that the fuel in the detonator cylinder can be compressed to a high ratio by the quick movement of the detonator piston. As the detonator piston completes its compression stroke and drives the burning gases into the power cylinder the detonator cylinder is then scavenged of spent gases ready to receive fresh fuel during the compression stroke of the power piston. The detonator of the character described is of a simple and compact arrangement of parts which will be positive in operation and permits the use of a relatively small amount of fuel to be raised to a detonating pressure and further permits a comparatively low compression ratio to be used in the power cylinder. An engine employing a detonator of this character will be easy to control and flexible as to speeds and is adaptable to any type of internal combustion engine either of the Diesel type or the electrical ignition type and when employed with the electrical ignition type all electrical equipment is dispensed with.

The drive or construction employed for operating the detonator piston should impart to said piston a very rapid movement both on its compression stroke and its reverse stroke. The drive mechanism retains the detonator piston in advance position or fully compressing position until the power cylinder has been scavenged of spent gases and the detonator piston is retracted only when the power cylinder contains a fresh fuel charge, thereby making scavenging of the detonator cylinder unnecessary. It is to be understood that the detonator piston is driven to its complete compression stroke when compressing the gases to bring about spontaneous combustion thereof and this drives the gases into the working cylinder, consequently clearing the detonator cylinder of burnt gases. The burning gas is driven from the detonator cylinder with great turbulence through and into the comparatively lower compressed gases in the power cylinder which brings about substantially complete instantaneous ignition and consequently more perfect combustion of the gases in the working cylinder and which is more complete than can be obtained from engines using electrical or Diesel principles of ignition. It is to be understood that the ignition of the gases in the power cylinder takes place at or immediately after the power piston has reached top dead center. The ignition from the detonator being extremely rapid, no allowance is necessary for ignition lag in the engine, consequently there is no head pressure to overcome as is now the case in the present types of engines. When the power piston of the working cylinder has reached top dead center with the relatively low compression ratio in said power cylinder the detonating cylinder discharges its rapidly expanding and ignited gases into the power cylinder which greatly increases the compression and produces the power thrust on the same amount of fuel far in excess of any power thrust now attained in present types of engines on the same proportionate amount of fuel.

What is claimed is:

In combination with an internal combustion engine having a power cylinder of a comparatively low ratio and a power piston therefor and provided with a fuel passage closed by said piston prior to reaching the limit of its fuel compressing stroke, a detonator cylinder having a restricted passage in communication with the power cylinder, and a fuel passage in communication with the first named fuel passage, a detonator piston operating in the detonator cylinder, and during certain of its positions closes and opens the second named fuel passage, and an operating means for the detonator piston driven by said engine to drive the detonator piston rapidly for compressing fuel in the detonator cylinder to a high compression ratio and thereby bringing about spontaneous combustion thereof and to force the burning fuel into the power cylinder under high velocity for igniting the low compressed fuel therein as the power piston completes its compression stroke and starts on its power stroke and retaining said detonator piston in its full compressing position during the exhaust stroke of the power piston and returning the detonator piston rapidly to its initial position after the completion of the exhaust stroke of said power piston.

FREDERICK P. GRAHMAN.